March 10, 1942.  W. H. WILCOX  2,275,709
SLAT FEEDING APPARATUS
Filed Aug. 6, 1940  5 Sheets-Sheet 1
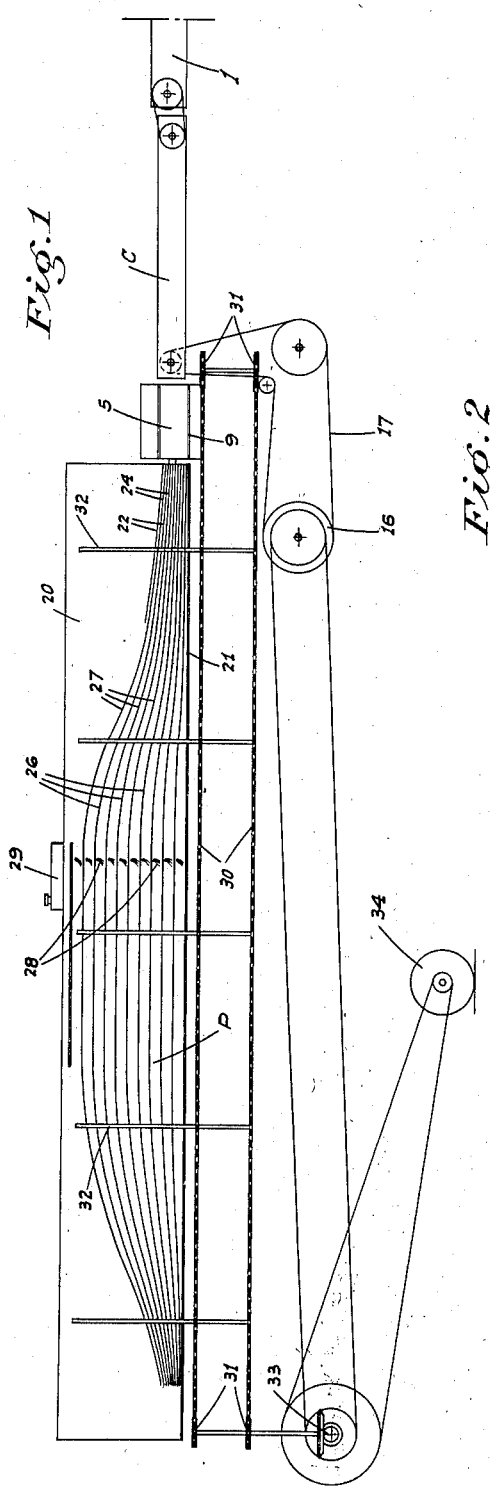
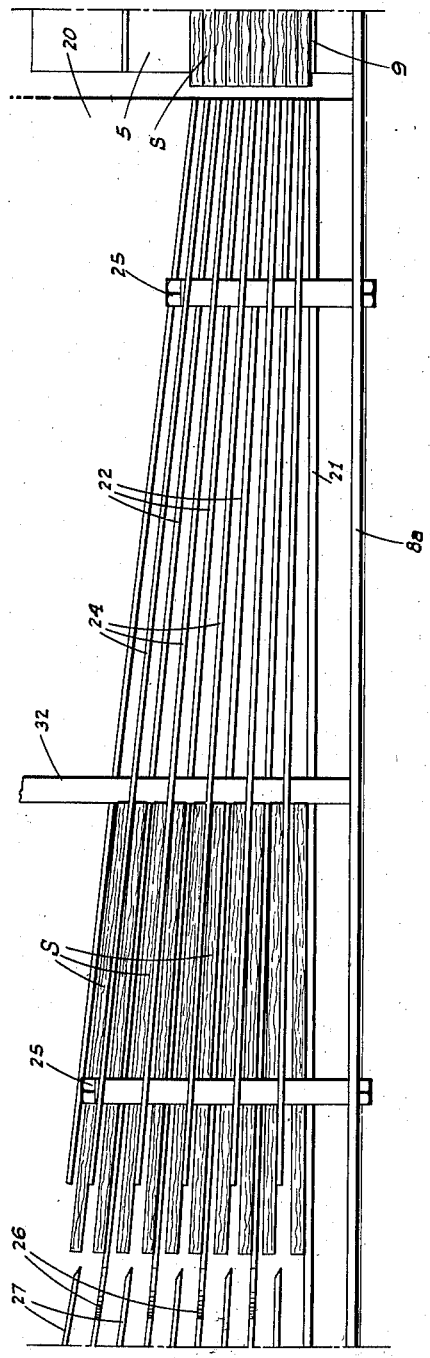
INVENTOR
W. H. Wilcox
BY
Webster & Webster
ATTORNEYS March 10, 1942. W. H. WILCOX 2,275,709
SLAT FEEDING APPARATUS
Filed Aug. 6, 1940 5 Sheets-Sheet 2

INVENTOR
W. H. Wilcox
BY
Webster & Webster
ATTORNEYS

March 10, 1942.         W. H. WILCOX                2,275,709
                     SLAT FEEDING APPARATUS
                      Filed Aug. 6, 1940              5 Sheets-Sheet 3
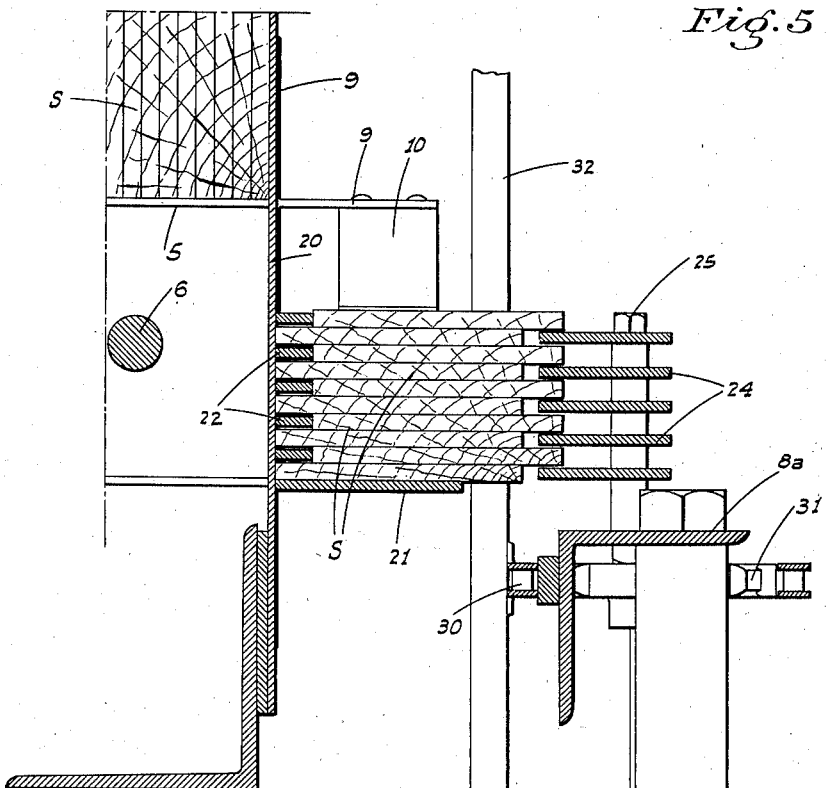
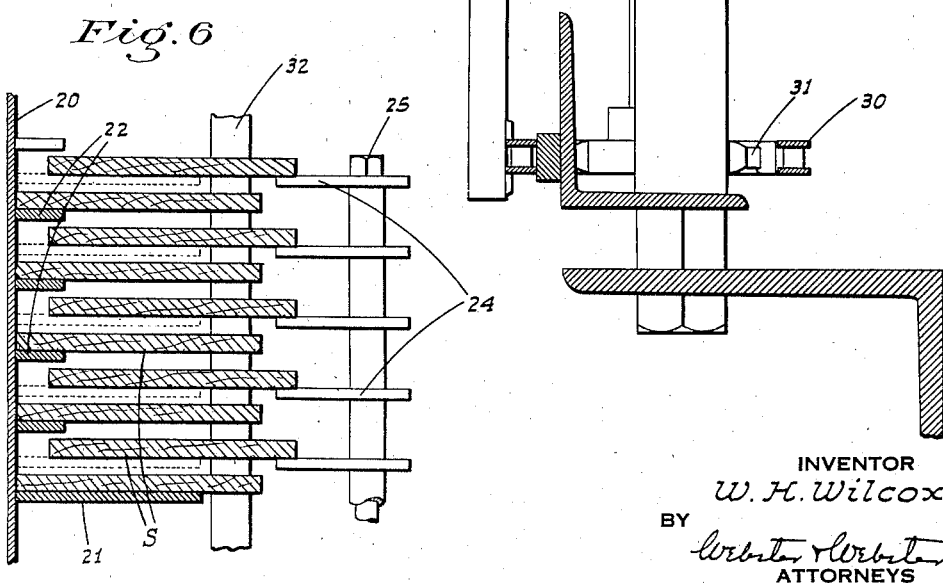
INVENTOR
W. H. Wilcox
BY
Webster & Webster
ATTORNEYS

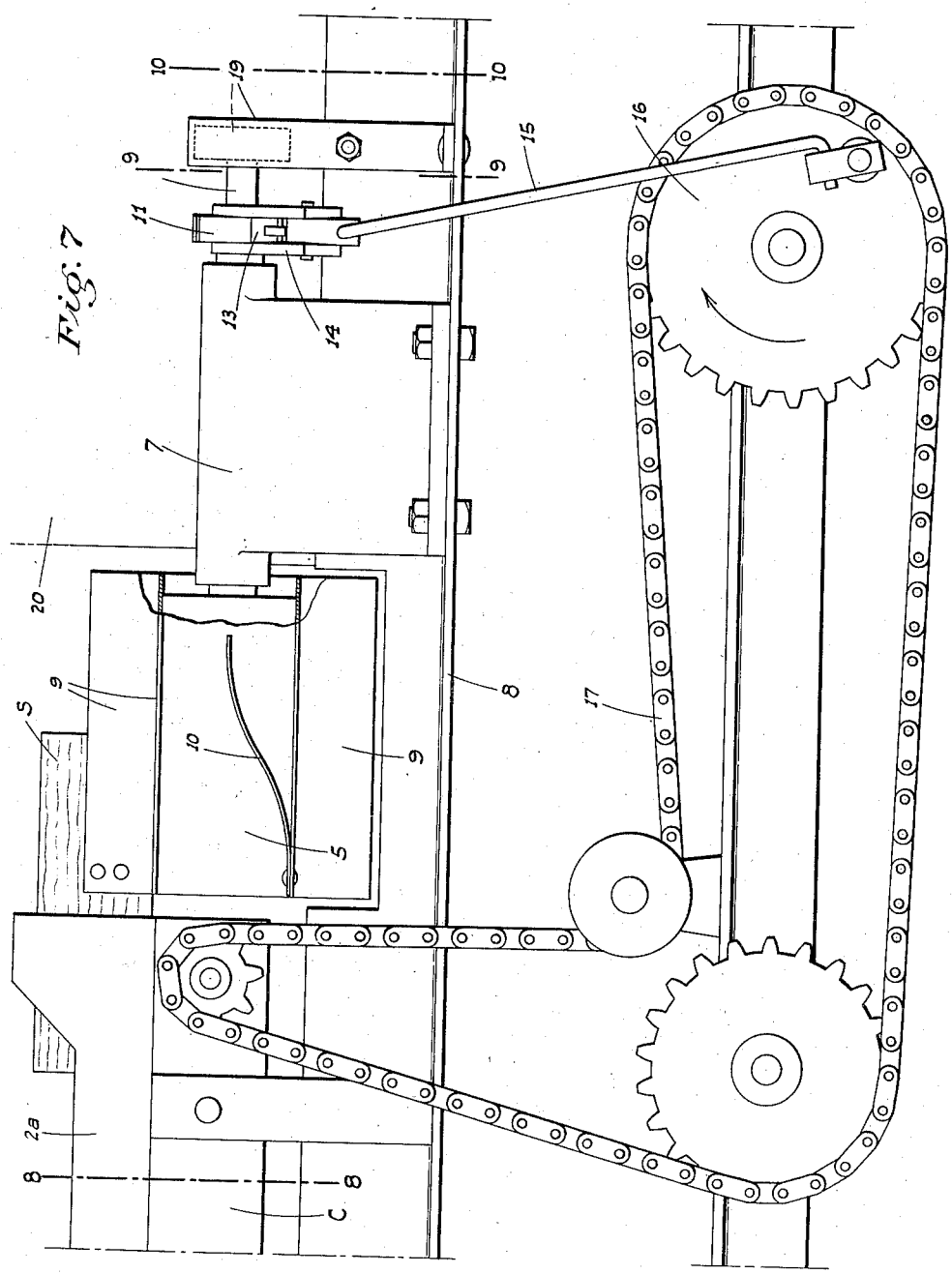

March 10, 1942.  W. H. WILCOX  2,275,709
SLAT FEEDING APPARATUS
Filed Aug. 6, 1940   5 Sheets-Sheet 5

INVENTOR
W. H. Wilcox
BY
ATTORNEYS

Patented Mar. 10, 1942

2,275,709

UNITED STATES PATENT OFFICE 2,275,709

SLAT FEEDING APPARATUS

William H. Wilcox, Stockton, Calif., assignor to California Cedar Products Company, a corporation Application August 6, 1940, Serial No. 351,562

12 Claims. (Cl. 198—34)

This invention relates in general to article feeding apparatus, and in particular the invention is directed to a unique form of feeding apparatus especially adapted for use in connection with the pencil slat manufacturing industry.

In the manufacture of pencil slats, the individual slats are cut from blocks by gang saws; the individual slats emerging from the saws in block shaped groups wherein the slats engage each other in face to face relation. In other words, the individual slats in each group remain in the same relation to each other as the material forming the same existed in the integral block.

It has been found desirable to maintain the individual slats in such groups to the extent possible in the course of manufacture whereby to effectuate improved handling technique, inspection and grading by block characteristics rather than individual slat characteristics, and similar advanced manufacturing operations. However, during manufacturing there are one or more operations which may preferably be carried out with the individual slats separated from each other; one such operation being the application of the wax to the slats.

It is therefore the principal object of this invention to provide slat feeding apparatus which is operative to receive such block shaped groups of slats from the gang saws; to thereafter separate the individual slats of each group into spaced relation; to advance the slats as so spaced whereby a manufacturing operation—such as waxing—may be carried out on each individual slat; and finally to return the individual slats of the group into engagement again as such block shaped group.

Another object of the invention is to provide slat feeding apparatus which is arranged so that said block shaped groups of slats, in which the individual slats are disposed on edge in close side by side relation when discharged from the gang saws, are received and rotated through an arc of approximately 90° so that the individual slats in the block are then disposed horizontally in superimposed relation; the groups of slats then being advanced and separated for a manufacturing operation and which can best be accomplished with the slats flat to the horizontal rather than on edge.

A further object of the invention is to provide slat feeding apparatus including unique means to introduce separating elements between the engaged slats of each block shaped group thereof, and wherein the slats initially engage each other in face to face relation.

An additional object of the invention is to provide apparatus which is operative to perform that method which includes the steps of separating the individual but initially engaged slats of a group; to then apply a quantity of fluid but solidifiable wax to each individual slat while thus separated; and thereafter to return the waxed slats into such initial position of engagement and as a group.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a diagrammatic side elevation of the apparatus.

Figure 2 is a fragmentary elevation showing the initial slat separating unit.

Figure 5 is a transverse section on line 5—5 of Fig. 3, looking back.

Figure 6 is a similar view on line 6—6 of Fig. 4, the alinement of the slats being diagrammatic.

Figure 7 is a fragmentary back side elevation showing the slat turn-over device and its operating mechanism.

Figure 3:
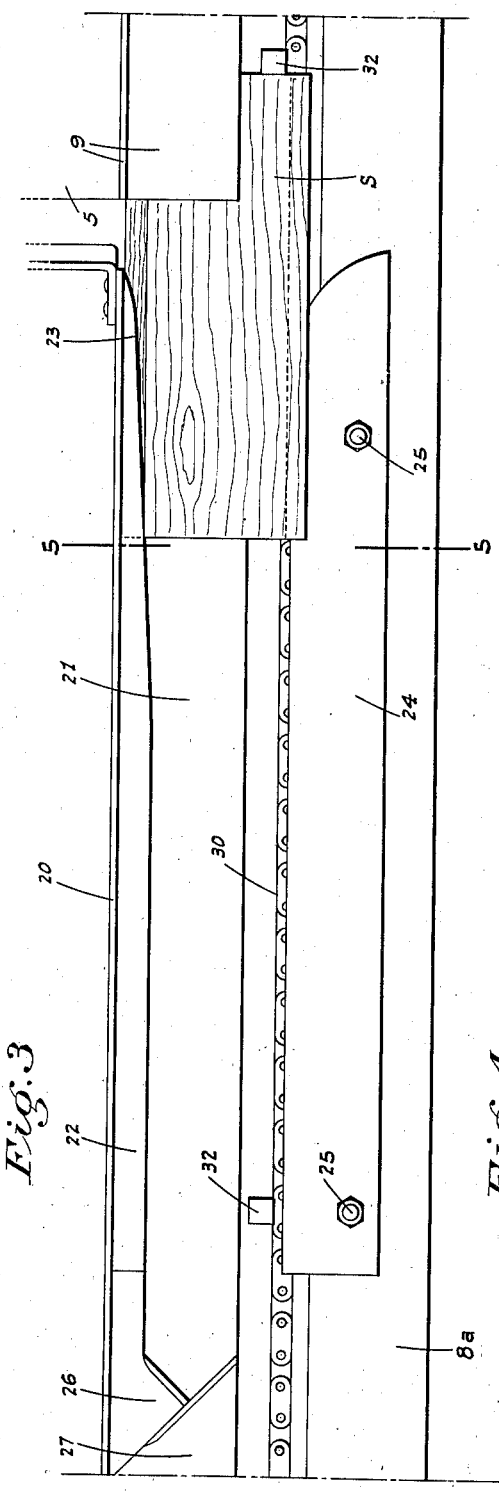
Figure 3 is a fragmentary plan showing the movement of the slats from the turn-over device onto the separating unit.

Referring now more particularly to the characters of reference on the drawings, the group of slats S as cut from a block pass on edge in their original substantially contacting relationship along a horizontal conveyor 1 which delivers them onto another conveyor C which comprises spaced slat-group supporting plates 2 having upstanding guide flanges 2a. Between and below the plates is disposed the upper run of a driven chain 3 having evenly spaced transverse lugs 4 at intervals riding on the plates and of a width to engage all the slats of each group and advance them simultaneously.

Disposed immediately beyond plates 2 is the slat turn-over device, which comprises a square body 5, each side of which is of sufficient width and length to support a slat group therein. The body is fixed on a rotary shaft 6 supported on a bearing 7 mounted on the frame 8 of the apparatus beyond the body. The shaft extends lengthwise of the conveyor and advancing slat groups in such position that each side in turn of the body will aline with plates 2. Pairs of upstanding flanges 9 rigid with the body are disposed along each side of the body, and a leaf spring 10 is mounted with one flange of each pair to engage and press a group of slats as advanced from the conveyor, against the other side flange. The body is thus formed with four identical troughs to alternately support a group of slats.

Figure 9:
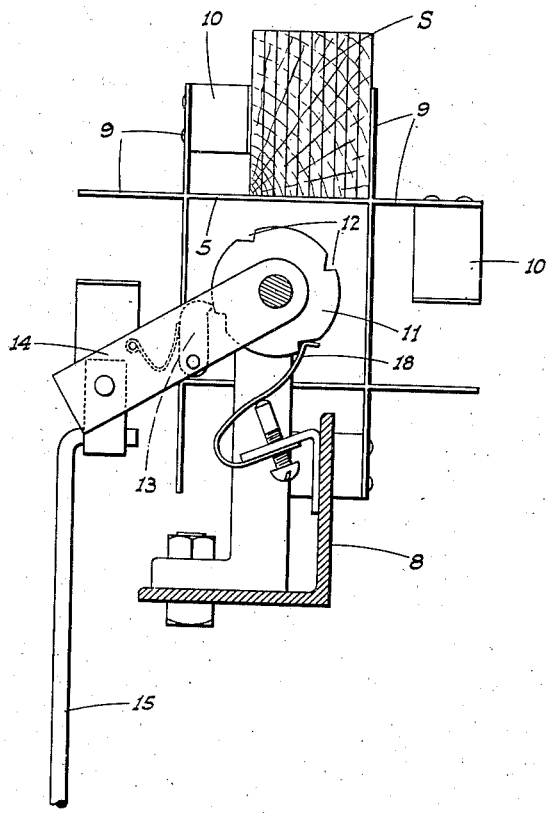
Figure 9 is a similar view on line 9—9 of Fig. 7.
Figure 10:
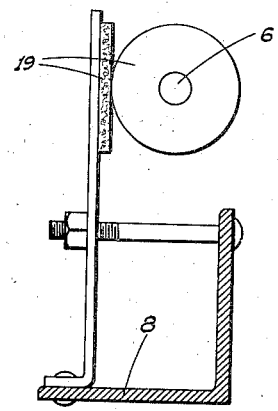
Figure 10 is a similar view on line 10—10 of Fig. 7.

After a group of slats is received on the body 5, the latter is automatically rotated through a quarter turn, to dispose the slats of the group horizontally and in superimposed relation, by the following means:

Fixed on shaft 6 beyond bearing 7 is a ratchet wheel 11 having four ratchets or notches 12 adapted to be engaged in turn by a pawl 13 carried by an arm 14 turnable on the shaft (see Fig. 9). The connecting rod or line 15 depends from the arm and has crank connection with a sprocket wheel 16 which is included in the chain drive mechanism 17 which drives conveyor C, so that the operation of the turn-over device is synchronized with the slat-feed movement of the conveyor. The arm and crank offset of the connecting rod are proportioned so that the rotary movement of the body will be exactly one quarter turn for each revolution of wheel 16. When the body has thus turned, a spring 18 engages one of the notches 12, and possible rotation of shaft 6 independent of the spring holding action is prevented by a brake unit 19 between shaft 6 and frame 8 (see Fig. 10).

When the slat-group is thus turned over, the side of the body against which the slats rest is in alinement with a fixed upstanding back plate 20 extending for some distance beyond the body, while the flange 9 of said side opposite that on which spring 10 is mounted is lowermost, and alines with a slat supporting strip 21 rigid with said back plate and extending the full length thereof, the lowermost slat of the group riding on this strip after being advanced from the turn-over device.

Figure 4:
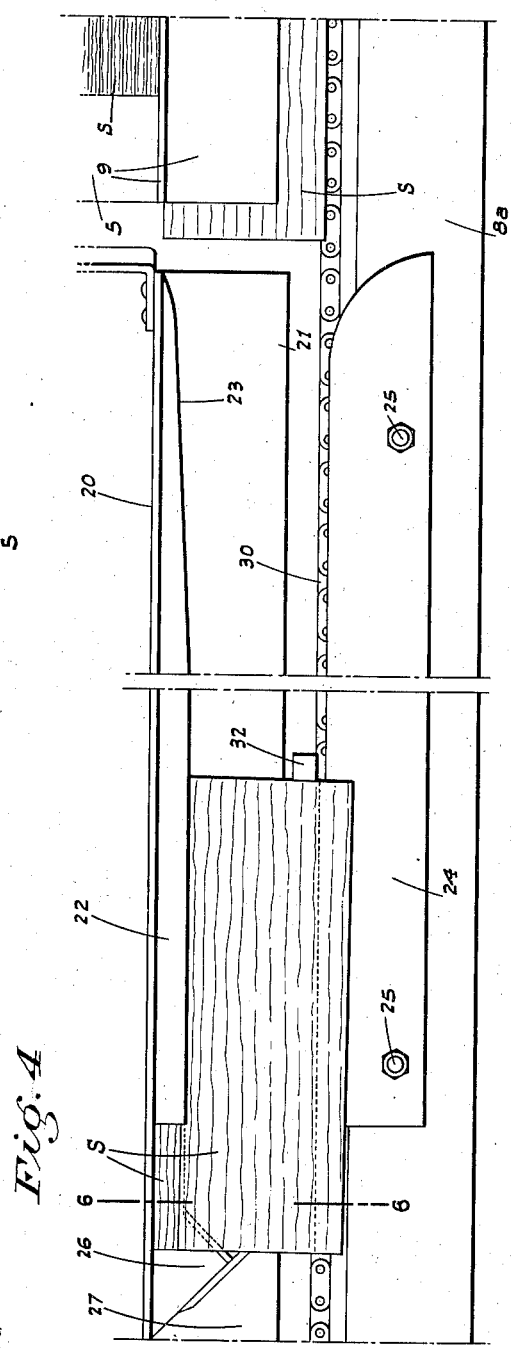
Figure 4 is a similar view showing the slats further advanced along the unit.
Figure 8:
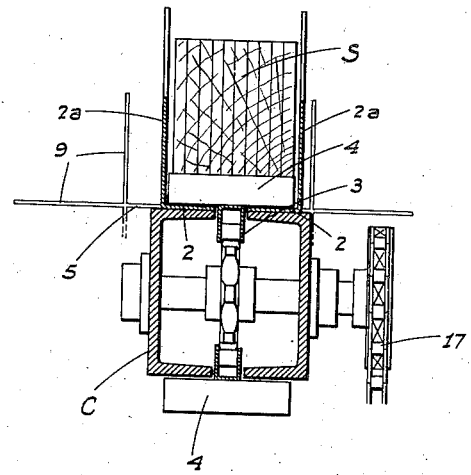
Figure 8 is a fragmentary cross-section on line 8—8 of Fig. 7.

Relatively narrow strips 22, spaced from each other and from strip 21 a distance equal to the thickness of the slats, are mounted rigid with the back plate and project from the same in overhanging relation to the plate 21. The strips 22 at their forward end taper to a feather edge with the back plate as shown at 23 in Fig. 4 and gradually diverge from each other and from plate 21 as shown in Fig. 2.

Disposed laterally out from plate 21 and from the slats as initially disposed thereon is another group of strips 24, of substantially the same length as strips 22 and diverging from each other to the same extent as strips 22.

The strips 24, however, while spaced apart the same as the thickness of the slats, are disposed in planes centrally between strips 22. In other words, strips 24 are alined with the odd slats of the group (commencing with the bottom one) while strips 22 are alined with the even slats of the group, as plainly shown in Fig. 5. Strips 24 are mounted in rigid relationship with the frame-supported back plate 20 by any suitable means, such as vertical bolts 25 through said strips upstanding from an auxiliary frame member 8a.

It will therefore be seen that as the slats of a group are advanced from the body 5, the odd slats will tend to remain in and move along a straight path, or so as to maintain engagement along one edge with back plate 20. The even slats, however, will be shifted laterally and away from the back plate as they engage the taper portion 23 of strips 22, as shown in Fig. 5. The spacing of strips 24 relative to strips 22 is such that the laterally shifted strips then overhang and are partially supported by said strips 24.

Once the even slats are thus supported, their continued advance will cause them to be separated in a vertical direction from the odd slats owing to the diverging arrangement of strips 24. At the same time, the odd slats, supported by strips 21 and 22, also become vertically separated, since strips 22 likewise diverge from each other. Wider slat supporting strips 26 project along the back plate for the remaining length thereof as extensions of strips 22. Other strips 27, the same width as strips 26, are mounted on the back plate 20 in horizontal alinement, at adjacent ends, with strips 24, so as to support the slats thereon as said slats are advanced beyond strips 24. These strips 27, at their end adjacent strips 24, run to a feather-edged point at their outer edge, which is nearest said strips as shown particularly in Fig. 3, so as to enable the slats to positively ride onto the same, even though the slats may then be disposed with somewhat of a lateral slant.

Strips 26 and 27, on which all the slats (except the bottom one) are then supported, diverge from each other for some distance and then extend straight and parallel for a further distance as shown at P in Fig. 1, and then again converge to a termination in such closely spaced relation as to bring the slats practically together again.

While the slats are moving along the straight portion P, they are waxed on their upper face by suitable means here diagrammatically shown as being a brush 28 for each such slat, receiving normally solid wax in a molten condition from a heated tank 29 behind the back plate 20. The slats are transferred from the turnover device onto the separating strips and advanced beyond the far end thereof by the following means: A vertically spaced pair of driven chains 30 mounted on end sprockets 31 and having their runs horizontal and parallel to and laterally out from back plate 20, extend from ahead of body 5 to a point beyond the converged termination of strips 26 and 27, as indicated in Fig. 1.

The run of the chains nearest the back plate is disposed in a transverse plate between strips 21 and 24, and the upper chain is below strip 21. Upstanding rods 32 are mounted at intervals on the chains, these rods being of sufficient height to engage all the slats when they are most widely separated. One pair of end sprockets 31 is connected to a suitable drive mechanism 33 as indicated in Fig. 1, which in turn is connected to the drive 17 so that the operation of the various drives is synchronized; an electric motor 34 being preferably employed as the source of power.

Since the rods 32 engage the slats at a point in their width closer to the side away from back plate 20 than to the near side, the pushing pressure of the rods against the slats has a tendency to force them laterally in and toward the back plate. Therefore, after the slats have been shifted laterally out by engagement with strips 22, they are again shifted laterally in and held against the back plate as soon as said slats become disengaged from said strips 22. By this means, all the slats are properly lined up as they move along the waxing zone, and waxing of the same area on all the slats is assured.

The slats are moved at a sufficient speed to give the apparatus a large capacity, as well as to assure that the slats are again brought together, after the wax is applied, before it has had time to solidify.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desired to secure by Letters Patent is:

1. A conveyor assembly comprising means to initially support a group of slats in a horizontal position and superimposed contacting relationship, vertically spaced slat supporting elements for the individual slats in the group extending for a predetermined distance beyond the initial support, said elements diverging from an initial spacing the same as the thickness of the slats and means to advance the slats from the initial support onto and along said elements.

2. A conveyor assembly comprising means to initially support a group of slats in a horizontal position and superimposed contacting relationship, vertically spaced slat supporting strips for the individual slats of the group extending for a predetermined distance from an inception beyond and spaced from the initial support, said strips at their inception being spaced apart a distance greater than the thickness of the slats and diverging thence from each other, means to advance the slats as a unit from the initial support onto the strips, and means engaging the slats between the support and strips and acting as the slats are advanced to separate the slats vertically and bring them into supporting position with the initial end of the strips.

3. A structure as in claim 2, with a back plate from which the strips project; the slat advancing means acting to exert a lateral pressure against the slats in the direction of said back plate.

4. A structure as in claim 2, with a back plate from which the strips project to a width less than that of the slats; the slat advancing means including a vertical member to engage the slats at their rear end laterally out from the strips.

5. A structure as in claim 2 with a back plate from which the strips project laterally and forming a stop for one side edge of the slats; said last named means including a support for the bottom slat projecting as a forward extension of the lowermost strip, other relatively narrow strips extending as forward extensions of alternate ones of the supporting strips and disposed with one edge against the back plate, said narrow strips at their forward end being spaced apart the thickness of the slats to form supports for the odd slats in the group at said one side thereof, and other similarly spaced strips mounted in opposed relation to the back plate and disposed to form supports for the even slats in the group along the other side thereof when said slats are shifted laterally away from the back plate, said other strips at their rear end alining horizontally with the adjacent end of the remaining first named strips; the outer edge of the narrow strips being sloped at their forward end to cause the even slats as initially engaged thereby with the advancing of the slats, to be shifted laterally and onto the last named strips.

6. Slat feeding apparatus including means to initially support a group of slats in horizontal stacked relation, a back plate extending from adjacent said support in line with one side edge of the group of slats, a strip projecting from the back plate in position to support the bottom slat of the group, a plurality of relatively narrow strips projecting from the back plate, said narrow strips at their head end being spaced apart to engage the remaining odd slats in the group, and being formed with a long taper on their outer edge, said narrow strips diverging from their head end to their rear termination, wider strips narrower than the slats projecting from the back plate as extensions of said narrow strips, similar strips disposed intermediate said wider strips and terminating adjacent the rear termination of the narrow strips, other strips extending parallel to the backplate for approximately the length of the narrow strips, the side edge of said other strips nearest the back plate being spaced therefrom a greater distance than the width of a slat but a lesser distance than the width of a slat from the adjacent edge of the narrow strips beyond the taper; said other strips at their head end being positioned to aline with the even slats in the group and at their rear end alining horizontally with said similar strips, and means to advance the slats as a unit from the initial support and onto and along said wider strips.

7. An apparatus as in claim 6, in which said slat advancing means comprises an endless driven chain, one run of which is parallel to the back plate and disposed in a plane laterally out from the back plate and a vertical rod on the chain projecting in a lateral plane to engage the slats at one end between the first named strips and said other strips.

8. Slat feeding apparatus comprising a conveyor for a group of slats disposed on edge in side by side relation, a plurality of supports for individual slats when horizontally disposed mounted in spaced relation to and beyond the conveyor, a turn-over device to receive the group from the conveyor and dispose them in a horizontal position, means to advance the slats as a unit from the device onto the supports, and drive means synchronized with the advancing means to operate said device.

9. Slat feeding apparatus comprising a conveyor for a group of slats disposed on edge in side by side relation, a rotary body mounted with its axis parallel to the conveyor and formed with a plurality of longitudinal troughs to receive the group of slats, said body being disposed so that the bottom of the trough when in one position will aline with the conveyor to receive the group therefrom and adapted to be rotated to another position so as to dispose one side of the trough horizontally, a support for the lowermost slat in the group mounted to aline with said one side of the trough when the same is horizontal, means to turn the body from one position to the other, and means to engage and advance the slats as a unit from the trough onto said support.

10. A structure as in claim 9 in which the sides of the trough are of lesser height than the width of the slats and the support is also of lesser width than a slat; the slat advancing means including a vertical member, movable lengthwise of the trough and support, to engage the group of slats at their rear end laterally out from the sides of the trough.

11. Apparatus as in claim 9, with means connecting the body turning means and slat advancing means in synchronized relation.

12. A conveyor assembly comprising means to initially support a group of slats in a horizontal position and in stacked relationship, a supporting unit for the individual slats of the group and including individual slat supporting elements extending from adjacent the supporting means for a predetermined distance and for a portion of their length intermediate their ends being spaced apart vertically a distance greater than the thickness of the slats, and means to advance the group of slats from the supporting means along the supporting unit; said elements being arranged to engage beneath corresponding ones of the slats with advance of the group thereof and to cause said slats to be gradually separated vertically from their stacked relationship until said portions of the elements are reached.

WILLIAM H. WILCOX.